United States Patent [19]

Chiba et al.

[11] Patent Number: 5,906,880
[45] Date of Patent: *May 25, 1999

[54] MAGNETIC RECORDING MEDIUM

[75] Inventors: Kazunobu Chiba; Kenichi Sato; Yuichi Arisaka; Yukari Yamada, all of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,562

[22] Filed: Apr. 25, 1996

Related U.S. Application Data

[63] Continuation of application No. 08/340,904, Nov. 15, 1994, abandoned, which is a continuation-in-part of application No. 07/800,627, Nov. 27, 1991, abandoned.

[30] Foreign Application Priority Data

Nov. 30, 1990 [JP] Japan ................................ 2-329625
Mar. 19, 1991 [JP] Japan ................................ 3-080680

[51] Int. Cl.⁶ ....................................................... G11B 5/66
[52] U.S. Cl. ........................... 428/141; 428/212; 428/213; 428/216; 428/336; 428/469; 428/472; 428/694 TS; 428/694 TM; 428/900
[58] Field of Search .................................... 428/141, 212, 428/213, 216, 336, 469, 472, 694 TS, 694 TM, 900

[56] References Cited

U.S. PATENT DOCUMENTS

| 4,371,590 | 2/1983 | Izumi et al. | 428/555 |
|---|---|---|---|
| 4,520,076 | 5/1985 | Saito et al. | 428/611 |
| 4,687,712 | 8/1987 | Sugita et al. | 428/611 |
| 4,842,917 | 6/1989 | Ohno et al. | 428/141 |
| 4,847,161 | 7/1989 | Rupp | 428/450 |
| 4,900,622 | 2/1990 | Nakayama et al. | 428/336 |
| 4,920,013 | 4/1990 | Kobayashi et al. | 428/694 |
| 5,066,552 | 11/1991 | Howard | 428/694 |
| 5,225,234 | 7/1993 | Takai et al. | 428/336 |
| 5,227,212 | 7/1993 | Howard | 360/97.01 |
| 5,247,397 | 9/1993 | Sato et al. | 360/17 |
| 5,453,886 | 9/1995 | Kobayashi et al. | 360/46 |

FOREIGN PATENT DOCUMENTS

| 0 216 610 | 4/1987 | European Pat. Off. . |
|---|---|---|
| 0 303 450 | 2/1989 | European Pat. Off. . |
| 0 415 335 | 3/1991 | European Pat. Off. . |

OTHER PUBLICATIONS

IEEE Transactions on Consumer Electronics vol. 35, No. 3, 1989, New York, US pp. 421–427 Chiba et al. Metal Evaporated Tape for High Band 8mm Video System p. 422, line 28—p. 425, line 17; FIG. 3.

IEEE Transactions on Magnetics vol. MAG22, No. 5, Sep. 1986, New York, USA pp. 328–330 Robinson C.J. 'Multilayer Films of CoCrTa for perpendicular Recording Media' p. 329, left column, line 4–line 14; FIG. 1.

Patent Abstracts of Japan vo. 11, No. 313 (P–626) Oct. 13, 9187 & JP–A–62 103 822 (Toray Ind. Inc.).

Patent Abstracts of Japan, vol. 12, No. 345 (P–759) (3192) Sep. 16, 1988 & JP=A–63 102 028 (Matsushita Electric Inc. C. Ltd.) May 6, 1988.

*Primary Examiner*—Stevan A. Resan
*Attorney, Agent, or Firm*—Frommer Lawrence & Haug, LLP.; William S. Frommer

[57] ABSTRACT

A magnetic recording medium, comprising a nonmagnetic substrate on the surface of which is deposited a magnetic layer. In one embodiment, the magnetic layer is formed of two thin films of magnetic metal and a layer of nonmagnetic material sandwiched therebetween, the layer of nonmagnetic material having a thickness no greater than 20% of the thickness of the magnetic layer, with the magnetic layer having an energy product of at least 100 gauss·cm·Oe as the product of its residual magnetic flux density, thickness and coercive force, and a surface roughness no greater than 0.003 μm in center line average height. In another embodiment, the magnetic layer, which may be a single layer of magnetic metal film or may be of the aforementioned multiple layer construction, is vacuum deposited onto the substrate at an incident angle in the range of 30° to 70°.

13 Claims, 14 Drawing Sheets

FIG. 14

| EXAMPLE | CONSTRUCTION | THICKNESS INTERMEDIATE LAYER (Å) | THICKNESS MAGNETIC LAYER (Å) | AVG. ROUGHNESS Ra (Å) | ENERGY PRODUCT (G·cm·Oe) | BIT ERROR RATE |
|---|---|---|---|---|---|---|
| 1 | EQUAL 2-LAYER | 200 | 2000 | 25 | 135 | $5.2 \times 10^{-5}$ |
| 2 | EQUAL 2-LAYER | 100 | 2000 | 21 | 142 | $4.0 \times 10^{-5}$ |
| 3 | EQUAL 2-LAYER | 200 | 2000 | 23 | 140 | $3.6 \times 10^{-5}$ |
| 4 | INVERSE 2-LAYER | 200 | 2000 | 26 | 139 | $7.8 \times 10^{-5}$ |
| COMPARATIVE | SINGLE LAYER | — | 2000 | 28 | 121 | $4.8 \times 10^{-4}$ |

FIG. 17

| EXAMPLE | INCIDENT ANGLE θ° | ENERGY PRODUCT (G·cm·Oe) | OUTPUT λ=0.5μm (dB) | BIT ERROR RATE |
|---|---|---|---|---|
| 5 | 40 to 70 | 148 | 0.5 | $5.0 \times 10^{-5}$ |
| 6 | 45 to 65 | 153 | 0.7 | $3.3 \times 10^{-5}$ |
| COMPARATIVE | 40 to 90 | 140 | 0 | $6.6 \times 10^{-4}$ |

FIG. 18

| EXAMPLE | CONSTRUCTION | THICKNESS INTERMEDIATE LAYER (Å) | THICKNESS MAGNETIC LAYER (Å) | INCIDENT ANGLE θ° | AVG. ROUGHNESS Ra (Å) | ENERGY PRODUCT (G·cm·Oe) | BIT ERROR RATE |
|---|---|---|---|---|---|---|---|
| 7 | EQUAL 2-LAYER | 200 | 2000 | 40 to 70 | 25 | 130 | $2.8 \times 10^{-5}$ |
| 8 | INVERSE 2-LAYER | 200 | 2000 | 40 to 70 | 25 | 130 | $3.3 \times 10^{-5}$ |
| REF. | EQUAL 2-LAYER | 200 | 2000 | 45 to 90 | 25 | 135 | $5.1 \times 10^{-5}$ |
| COMPARATIVE | SINGLE LAYER | — | 2000 | 40 to 90 | 28 | 121 | $4.8 \times 10^{-4}$ |

F I G. 19
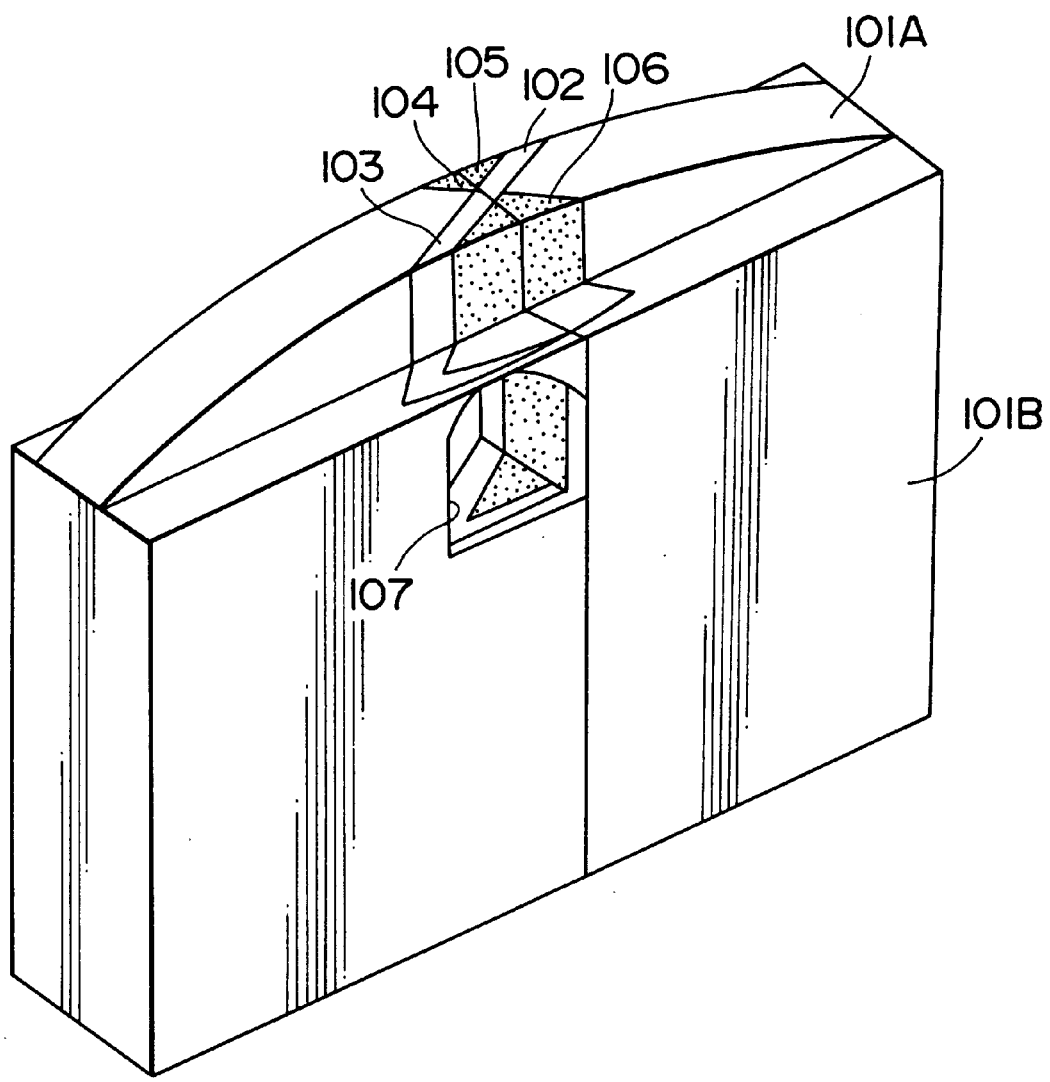

MAGNETIC RECORDING MEDIUM

This application is a continuation of application Ser. No. 08/340,904, filed Nov. 15, 1994, now abandoned which was a continuation-in-part of Ser. No. 07/800,672 filed Nov. 27, 1991 now abandoned.

BACKGROUND OF THE INVENTION

1. Field of the Invention

This invention relates generally to a magnetic recording medium and, more particularly, to such a medium that provides improved characteristics ideally suited to record digital video signals.

2. Related Applications

U.S. Ser. No. 07/784,751, filed Oct. 30, 1991 and assigned to the Assignee of the present invention.

Description of the Prior Art

D1 format component type digital VTRs and D2 format composite type digital VTRs have been developed for use by broadcasting stations to digitize color video signals and to record the digitized signals on a recording medium, such as a magnetic tape.

In the D1 format digital VTR, a luminance signal (Y) and first and second color difference signals (U and V) are converted by analog-to-digital (A/D) conversion using sampling frequencies of 13.5 MHz and 6.75 MHz, respectively, to digitize the luminance signal and to digitize each of the color difference signals. Thereafter, the signals are suitably processed and then recorded on a magnetic tape. Since the ratio of sampling frequencies of the signal components is 4:2:2, this system is usually referred to as the 4:2:2 system.

On the other hand, in the D2 format video digital VTR, a composite video signal is sampled with a signal having a frequency 4 times higher than the frequency fsc of the usual color subcarrier signal and then A/D converted. Thereafter, the resultant signal is suitably processed and then recorded on a magnetic tape.

Since these known D1 and D2 format digital VTRs are designed for professional use, for example, in broadcasting stations, the attainment of high picture quality is given top priority in the design and construction of such VTRs, and the weight and size of the apparatus are not overly important.

In these known digital VTRs, the digital color video signal, which results from each sample being digitized into, for example, 8 bits, is recorded without being substantially compressed. As an example, when the known D1 format digital VTR A/D converts each sample into 8 bits with the frequencies noted above, the data rate representing the color video signal is 13.5 MHz×8+6.75 MHz×8+6.75 MHz×8 or approximately 216 Mbps (megabits per second). If the horizontal and vertical blanking intervals are ignored, the number of effective picture elements of the luminance signal per horizontal interval and the number of effective picture elements of each color difference signal per horizontal interval become 720 and 360, respectively. In the NTSC system, which has 525 lines per frame and 60 fields per second, the number of effective scanning lines for each field is 250, and the data bit rate Dv can be expressed as follows:

Dv=(720+360+360)×8×250×60=172.8 Mbps

In the PAL system, since the number of effective scanning lines for each field is 300 and the number of fields per second is 50, it is clear that the data bit rate is the same as that in the NTSC system. If redundant data necessary for error correction and if formatting are considered, the total bit rate of picture data becomes approximately 205.8 Mbps.

Further, the amount of audio data Da to be transmitted with the digitized video signals is approximately 12.8 Mbps, while the amount of additional data Do, such as, data representing a gap, a preamble, and a postamble used in editing, is approximately 6.6 Mbps. Thus, the overall bit rate of information data to be recorded can be expressed by the following equation:

$Dt=Dv+Da+Do$ $Dt=172.8+12.8+6.6=192.2$ Mbps.

To record this amount of information data, the known D1 format digital VTR employs a segment system having a track pattern comprised of 10 tracks for each field in the NTSC system, or comprised of 12 tracks for each field in the PAL system.

In the known D1 format digital VTRs, a recording tape with a width of 19 mm is used. Typically, there are two types of recording tapes having thicknesses of 13 $\mu$m. and 16 $\mu$m, respectively. To house these tapes, three different sizes of cassettes are used, which are respectively characterized as being large, middle and small. The information data is recorded on such tapes in the above mentioned format with the tape area for each bit of data being approximately 20.4 $\mu m^2$/bit, which corresponds to a recording density of 1/20.4 bit/$\mu m^2$. If the recording density is increased, an error tends to take place in the playback output data due to interference between codes or non-linearity of the electromagnetic conversion system of the head and tape. Heretofore, even if error correction encoding has been performed, the above given value of the recording density has been the limit therefor.

By putting all the above described parameters together, the playback times for the cassettes of various sizes and the two tape thicknesses, when employed in the digital VTR in the D1 format, can be tabulated as follows:

| Size/tape thickness | 13$\mu$m | 16$\mu$m |
| --- | --- | --- |
| Small | 13 minutes | 11 minutes |
| Middle | 42 minutes | 34 minutes |
| Large | 94 minutes | 76 minutes |

Although the described D1 format digital VTR provides satisfactorily high picture quality for use in broadcasting stations, even if a large cassette housing a tape with a thickness of 13 $\mu$m is used, the playback time is at most 1.5 hours. Such a VTR is not adequate for consumer or home use in which a playback time at least sufficient for the recording of a telecast movie is required. VTRs intended for consumer or home use with adequate recording/playback time include the β system, the VHS system and the 8-mm system, each of which records and reproduces analog video signals. Although the picture quality of these analog VTRs has been improved to the point where quality is satisfactory when a video signal is simply recorded and then reproduced for viewing, the quality o the picture is significantly degraded when the recorded signal is dubbed and/or copied. Thus, when the recorded signal is dubbed several times, the picture quality will become unacceptable to viewers.

If signals of wavelengths as short as 0.5 $\mu$m are recorded in tracks having a width of 5 $\mu$m so as to reduce the recording area to 1.25 $\mu m^2$ per bit, that is, a recording density of 0.8 bit per $\mu m^2$, and if the recording operation includes data compression which adequately compresses the recording data without resulting in substantial distortion of the reproduced signals, then long-timed digital recording and reproducing of video signals may be possible even with magnetic tapes having a width of 8 mm or less and a length that can be readily contained in a cassette of a size not substantially larger than the cassette used with the analog 8-mm system.

However, attempts to decrease the recorded bit area to about 1.25 $\mu m^2$ per bit have resulted in unacceptably high bit error rates upon playback.

OBJECTS AND SUMMARY OF THE INVENTION

Accordingly, it is an object of the present invention to provide a magnetic recording medium that can be used to record analog or digital video signals, and when used with the latter has a recorded bit area no greater than 1.25 $\mu m^2$ per bit, and has an acceptably low raw bit error rate, that is, a bit error rate prior to error correction of the reproduced digital video signals, that is no greater than $1 \times 10^{-4}$.

Another object of the present invention is to provide a magnetic recording medium which, when digital video signals are recorded thereon with a recorded bit area not greater than 1.25 $\mu m^2$ per bit, contributes to the maintenance of the desired raw bit error rate to no more than $1 \times 10^{-4}$.

Still another object of the present invention is to provide a magnetic recording medium having improved output characteristics and carrier-to-noise ratios C/N for analog video signals having wavelengths on the order of 0.5 $\mu m$.

A further object of this invention is to provide a recording medium capable of recording digital video signals with a density of 0.8 bit per $\mu m^2$ and a bit error rate of no more than $1 \times 10^{-4}$.

In according with one embodiment of this invention, a magnetic recording medium is comprised of a nonmagnetic substrate having a magnetic layer deposited thereon, preferably by vacuum deposition, which is formed of alternate thin films of magnetic metal and nonmagnetic material and sandwiched therebetween. In one example, only two magnetic metal thin films are deposited. The nonmagnetic thin film has a thickness no greater than 20% of the total thickness of the magnetic layer; and the magnetic layer has an energy product of at least 100 guauss·cm·Oe, and a surface roughness no greater than 0.003 $\mu m$ in center line average height.

As a feature of this embodiment, the magnetic layer is evaporated onto the substrate at an incident angle relative to a normal to the surface of the substrate in the range 30° to 70°, and more particularly, 40° to 70°. Preferably, the incident angle is in the range 45° to 65°. As a result, the grain size of the magnetic particles in the magnetic layer is reduced, thereby improving the reduction in the bit error rate of the medium.

In accordance with another embodiment, the nonmagnetic thin film is omitted from the magnetic layer.

The above, and other objects, features and advantages of the invention, will be readily apparent from the following detailed description of illustrative embodiments thereof when read in connection with the accompanying drawings.

BRIEF DESCRIPTION OF THE DRAWINGS

FIG. 14 is a chart illustrating the improved performance resulting from the recording medium of the present invention;

FIG. 17 is a chart illustrating the improved performance resulting from another embodiment of the present invention;

FIG. 18 is a chart illustrating the improved performance resulting from a combination of the aforementioned embodiments of the present invention; and FIG. 19 is a perspective view showing an example of a preferred construction of a magnetic head.

DETAILED DESCRIPTION OF PREFERRED EMBODIMENTS OF THE INVENTION

Figure 1:
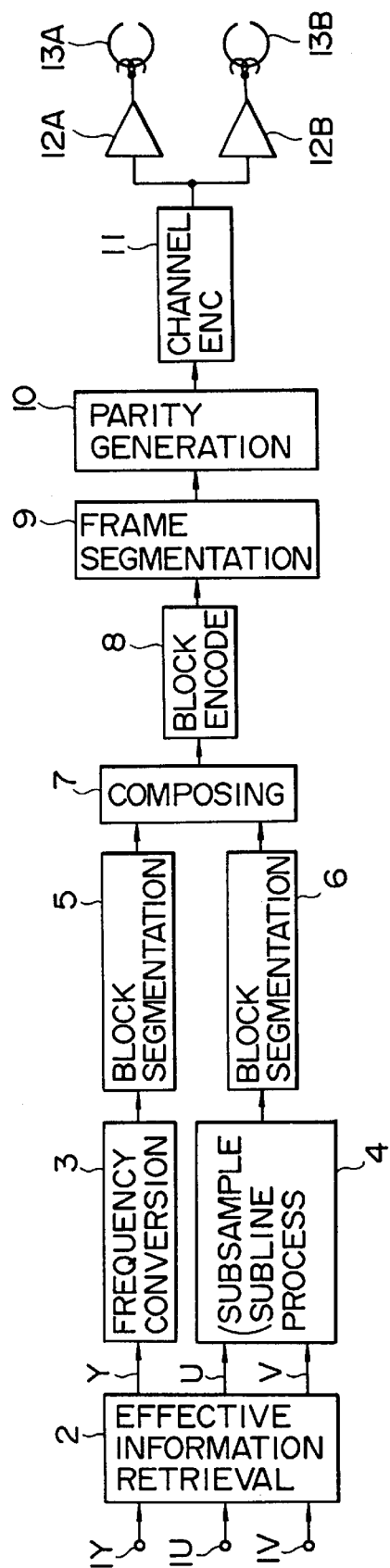
FIG. 1 is a block diagram showing a signal processing portion of a recording circuit in a digital VTR in which the present invention finds ready application.

First, a signal processing portion of a recording circuit in a digital VTR will be described with reference to FIG. 1 in which a digital luminance signal Y and digital color difference signals U and V, derived from three primary color signals R, G, and B produced by, for example, a color video camera, are supplied to input terminals 1Y, 1Y, and 1V, respectively. In this case, the clock rates of the signals Y, U and V are the same as the frequencies of the component signals in the above described D1 format. In other words, the sampling frequencies are 13.5 MHz for the luminance signal Y and 6.75 MHz for each of the color difference signals U and V, respectively. Each sample is digitized into eight bits per sample. Thus, the data rate of the signals sent to the input terminals 1Y, 1U, and 1V is approximately 216 Mbps as was described earlier.

An effective information retrieval circuit 2, or blanking interval filter, is adapted to remove data from the signals present during the blanking intervals and thereby retrieve information only in the effective picture area. This compresses the data to a data rate of approximately 167 Mbps. The luminance signal Y extracted by the effective information retrieval circuit 2 is applied to a frequency conversion circuit 3 which converts the sampling frequency from 13.5 MHz to ¾ thereof, that is, to 10.125 MHz. A thin-out filter may be used or the frequency conversion circuit 3, so as to prevent reflected distortion from taking place.

The output signal from the frequency conversion circuit 3 is coupled to a block segmentation circuit 5 which converts the serial luminance data into a sequence of blocks. The block segmentation circuit operates to condition the data for processing by a block encoding circuit 8 disposed at a later stage of the recording circuit.

Figure 3:
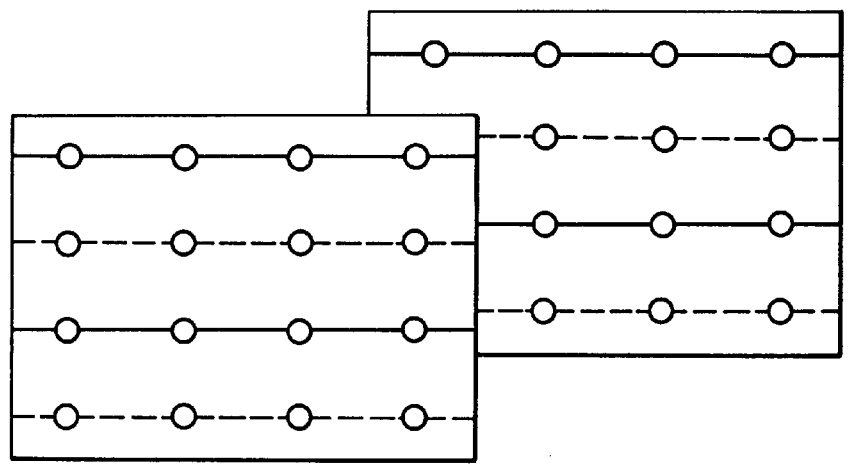
FIG. 3 is a schematic diagram showing an example of block-by-block encoding.

Reference to FIG. 3 will show a construction of a three-dimensional block which is used as an encoding unit. By dividing two frames of a video picture, as shown in FIG. 3, a large number of unit blocks (4 lines×4 picture elements×2 frames) are formed. In FIG. 3, the solid lines represent lines of odd fields, while the dotted lines represent lines of even fields.

Figure 4:
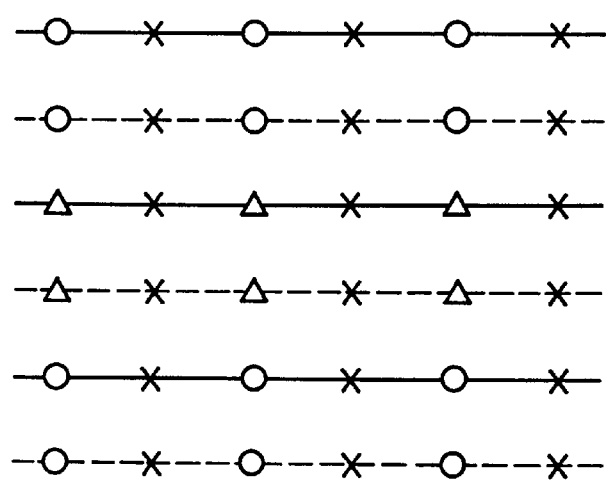
FIG. 4 is a schematic diagram to which reference will be made in describing operation of a subsampling and sublime processing circuit.

Returning to FIG. 1, it will be seen that the two color difference signals U and V produced by the effective information retrieval circuit 2, are supplied to a subsampling and subline processing circuit 4. The subsampling and subline processing circuit operates to convert the sampling frequency of these signals from 6.75 MHz to one-half thereof, that is, to 3.375 MHz, and then selects the two digital color difference signals alternately for each line. That is, subsampling and subline circuit 4 combines the two digital color difference signals into one data channel and thereby provides a line sequential digital color difference signal. FIG. 4 shows an arrangement of the picture elements of the signal which are sub-sampled and sub-lined by circuit 4. In FIG. 4, "○" represents a sampling picture element of the first color difference signal U; "Δ" represents a sampling picture element of the second color difference signal V; and "X" represents a position of a picture element which is omitted, or thinned out, by the subsampling.

The line sequential signal produced by subsampling and subline circuit 4 is supplied to a block segmentation circuit 6. Block segmentation circuit 6 is similar to block segmentation circuit 5 and is adapted to convert scanning or line sequential color difference data of television signals into block sequential data. In other words, block segmentation circuit 6 converts the color difference data into a block arrangement (4 lines×4 picture elements×2 frames).

The outputs signals from block segmentation circuits 5 and 6 are coupled to a composing circuit 7 which converts into one data channel the luminance signal and the color difference signals which have been converted into block sequential signals. The output signal of the composing circuit is supplied to a block encoding circuit 8 which may include, as will be described later in detail, an encoding circuit adaptable to the dynamic to the dynamic range of each block, for example, an ADRC circuit, a Discrete Cosine Transform (DCT) circuit, or the like. The output signal from the block encoding circuit is applied to a frame segmentation circuit 9 which converts the encoded block data into a frame arrangement or construction. The frame segmentation circuit also converts the picture system clock of the block encoded data to a record system clock.

The output signal from frame segmentation circuit 9 is supplied to a parity generating circuit 10 which generates a parity useful as an error correction code. The output signal of the parity generation circuit is supplied to a channel encoder 11 adapted to perform channel encoding effective to reduce low frequency components of the data to be recorded. The output signal of the channel encoder 11 is supplied through respective recording amplifiers 12A and 12B and rotary transformers (not shown) to rotary magnetic heads 13A and 13B for recording on the magnetic tape.

Although not shown on FIG. 1, an audio signal also is compressed and encoded apart from the video signal, and the resulting audio data is multiplexed or mixed with the video data and supplied with the latter to the channel encoder 11.

With the above described signal processing portion of the recording circuit, by removing the blanking intervals of the video data, the data rate is described to approximately 167 Mbps from the input data of 216 Mbps. In addition, with the frequency conversion and the sub-sampling and sub-line processing, the resultant data rate is decreased to 84 Mbps. Data compression and encoding by block encoding circuit 8 achieves an additional data rate reduction to approximately 25 Mbps. Thereafter, by adding additional information, such as, parity data and audio data, to the resultant compressed video data, the bit rate of the data to be recorded amounts to approximately 31.5 Mbps.

The playback circuit of a digital VTR according to an embodiment of this invention will now be described with reference to FIG. 2, in which reproduced data from the magnetic heads 13A and 13B are supplied through respective rotary transformers (not shown) and playback amplifiers 21A and 21B to a channel decoder 22. The channel decoder demodulates channel encoded data, and the resultant output signal is sent to a time base correction (TBC) circuit 23 for removing time base fluctuating components from the reproduced or playback signal.

The playback data from the TBC circuit is supplied to an error correction circuit (ECC) 24 which uses an error correction code to correct and modify errors.

The error-corrected signal provided by the ECC circuit is supplied to a frame disassembling circuit 25 which separates from a data frame each component of block encoded picture data and re-converts the data clock from the recording system clock to the picture system clock. The data separated by the frame disassembling circuit are sent to a block decoding circuit 26 which returns the block encoded data to its original block form, as had been supplied originally to block encoding circuit 8 of FIG. 1. The decoded picture data which is produced by block decoding circuit 26 is applied to a distribution circuit 27.

The distribution circuit separates luminance data and color difference data from the decoded data, and the separated luminance and color difference data are coupled to respective block disassembling circuits 28 and 29. The block disassembling circuits are adapted to convert block sequence signals into raster scanning sequence signals, and thus, function in a manner complementary to block segmentation circuits 5 and 6 in the recording circuit.

The decoded luminance signal produced by block disassembling circuit 28 is applied to an interpolation filter 30, which converts the sampling rate of the luminance signal from 3fs, to 4fs (where 4fs=13.5 MHz). The digital luminance signal Y thus produced by the interolation filter is derived from an output terminal 33Y.

The digital color difference signals produced by block disassembling circuit 29 are applied to a distribution circuit 31 which functions to separate digital color difference signals U and V from the line sequential digital color difference signals. The digital color difference signals U and V thus separated by the distribution circuit are supplied to an interpolation circuit 32 which interpolates, from the decoded picture element data, the line and picture element data that had been omitted, or thinned out. Interpolation circuit 32 provides digital color difference signals U and V with a sampling rate 4fs, and these digital color difference signals are provided at output terminals 33U and 33V, respectively.

The block encoding circuit 8 in the recording circuit of FIG. 1, may be an ADRC (Adaptive Dynamic Range Coding) encoder, which generally detects the maximum value MAX and the minimum value MIN of data representing a plurality of picture elements contained in each block and then detects a dynamic range DR of the block therefrom. Thereafter, the ADRC encoder encodes the data in accordance with the dynamic range and then requantizes the data with bits which are smaller in number than the data bits representing the original picture elements. As an alternative to the foregoing, the block encoding circuit 8 may first DCT (Discrete Cosine Transform) the picture element data of each block, and then quantize coefficient data obtained by the DCT process. Thereafter, the quantized data is compressed by the run-length Huffman encoding process.

Figure 5:
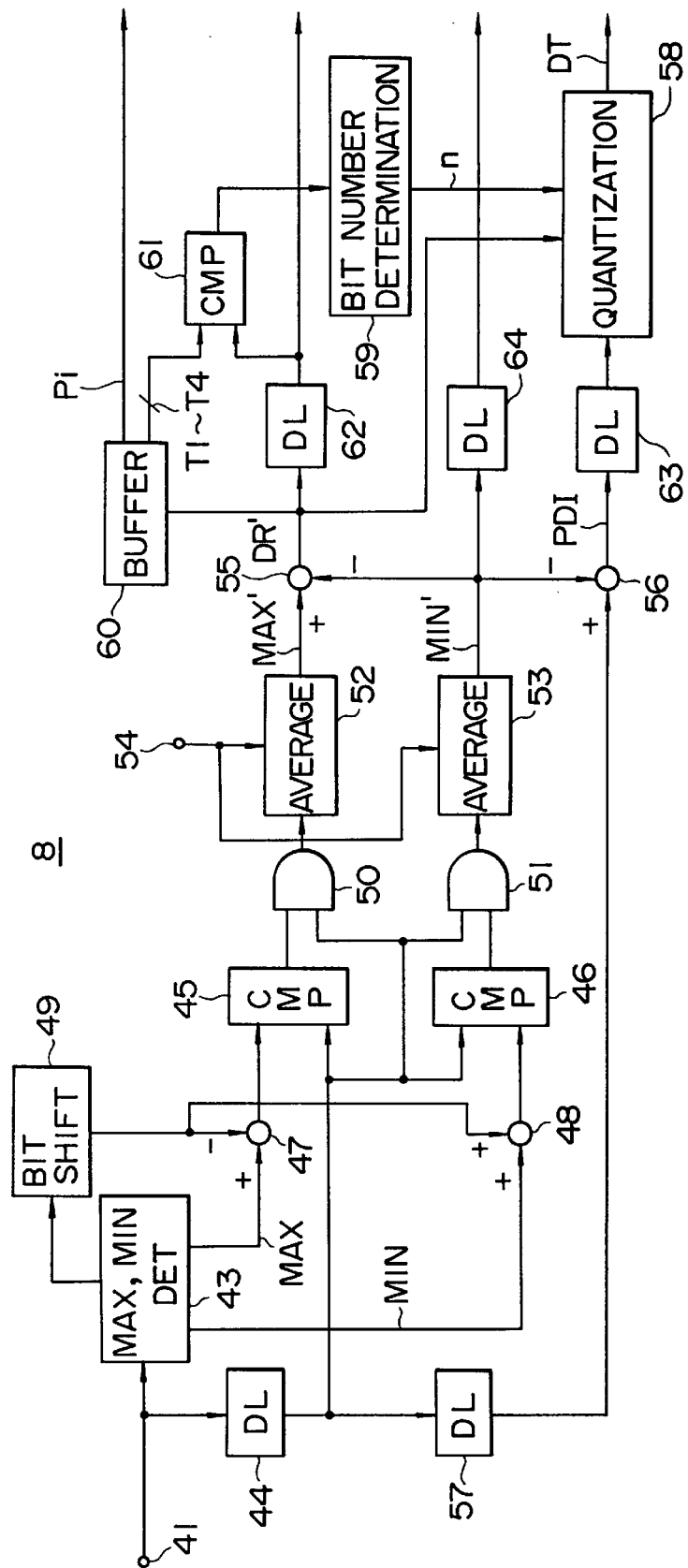
FIG. 5 is a block diagram showing an example of a block encoding circuit that may be included in the recording circuit of FIG. 1.

Referring now to FIG. 5, an example of encoding circuit 8 using an ADRC encoder, and with which picture quality is not degraded by multiple dubbing operations, is illustrated. This encoder is of the type described in Japanese patent applications 52-266407 (1984) and 59-269866 (1984) filed by the present assignee. It is seen that a digital luminance signal (or a digital color difference signal) having each sample quantized to 8 bits is received from composing circuit 7 at an input terminal 41. When implemented as an ADRC encoded, the encoding circuit detects the maximum MAX and minimum MIN values of the plural picture element samples included in a given block, determines the dynamic range DR of that block from the detected maximum MAX and minimum MIN, performs a coding operation suitable for that dynamic range DR and requantizes the sampled picture elements by using less bits for each sample than those of the original picture element samples. If the block-coding circuit is implemented as a DCT circuit in which the picture element samples of each block are transformed by discrete cosine transform, coefficient data obtained by the DCT circuit is quantized and then encoded by run length Huffman coding for compression coding.

In the ADRC implementation, each input 8-bit sample is applied to a maximum value and minimum value detection circuit 43 and to a delay circuit 44 by way of a blocking circuit 42. Maximum value and minimum value detection circuit 43 detects the minimum value MIN and the maximum value MAX for each block. Delay circuit 44 delays the input data for a time period equivalent to that necessary for circuit 43 to detect the maximum value and the minimum value in a block. The delayed picture element data from delay circuit 44 is applied to comparison circuits 45 and 46.

The maximum value MAX from maximum value and minimum value detection circuit 43 is applied to one input of a subtraction circuit 47; and the minimum value MIN from the maximum value and minimum value detection circuit is applied to one input of an addition circuit 48. A value $\Delta$ representing one quantized step width ($\Delta$=1/16 DR where non-edge matching quantization is performed with a quantizing length of 4 bits) is supplied from a bit shift circuit 49 to the other inputs of subtraction circuit 47 and addition circuit 48. In the bit shift circuit, the dynamic range DR is shifted by 4 bits to effect a division of (1/16). Subtraction circuit 47 provides at its output a threshold value of (Max–$\Delta$), and addition circuit 48 provides at its output a threshold value of (MIN–$\Delta$). The threshold values produced by subtraction circuit 47 and addition circuit 48 are applied to comparison circuits 45 and 46, respectively, for comparison therein with the delayed picture element data from delay circuit 44.

Alternatively, the value $\Delta$ which determines the threshold values may be a fixed value equivalent to a noise level rather than the quantizing step width DR/16.

The output signal of comparison circuit 45 is applied to one input of an AND gate 50. Similarly, the output signal of comparison circuit 46 is applied to one input of an AND gate 51. The output of delay circuit 44 is applied in common to the other inputs of AND gate 50 and 51. It will be seen that the output signal of comparison circuit 45 becomes high ("1") when the level of the input data is larger than that of the threshold value (MAX–$\Delta$). Thus, the picture element data which are in the maximum level range of (MAX to MAX–$\Delta$) are passed by AND gate 50. Likewise, the output signal of comparison circuit 46 becomes high ("1") when the level of the input data is smaller than that of the threshold value (MIN+$\Delta$). Thus, the picture element data which are in the minimum level range of (MIN to MIN+$\Delta$) are passed by AND gate 51.

The picture element data passed by AND gate 50 is supplied to an averaging circuit 52. Similarly, the picture element data passed by AND gate 51 is supplied to an averaging circuit 53. These averaging circuits calculate average values for each block supplied thereto. A reset signal is applied from a terminal 54 to the averaging circuits 52 and 53 at the beginning of each block. Averaging circuit 52 produces an average value MAX' of picture element data in the maximum level range of (MAX to MAX–$\Delta$), and averaging circuit 53 produces an average value MIN' of picture element data in the minimum level range of (MIN to MIN+$\Delta$). A subtraction circuit 55 subtracts the average value MIN' from the average value MAX' to produce an adjusted dynamic range DR'.

The average value MIN' is also applied to a subtraction circuit 56 which operates to subtract the average value MIN' from input data supplied to circuit 56 through a delay circuit 57 which compensates for (e.g., matches) the inherent delay of comparison circuit 46 and averaging circuit 53. Subtraction circuit 56 produces data PDI from which the minimum value is removed. The data PDI and the adjusted dynamic range DR' are applied to a quantizing circuit 58. In the present embodiment ADRC with variable length is used, with the number of bits (i.e. the length) assigned for quantization by quantizing circuit 58 selected to be 0 bit (no code signal transmission), 1 bit, 2 bits, 3 bits, or 4 bits, and an edge matching quantizing operation is performed. The number n of bits assigned is determined for each block by a bit number determination circuit 59 which supplies data representing the bit number n to quantizing circuit 58.

In ADRC with variable length encoding, for a block where the dynamic range DR' is small, the bit number n is decreased. Conversely, for a block where the dynamic range DR' is large, the bit number n is increased. As a result, the encoding operation can be effectively performed. That is, a threshold value for determining the bit number n is T1 to T4 (where T1<T2<T3<T4). For a block in which DR'$\leq$T1, the code signal is not transmitted (n=0), but only information of the dynamic range DR' is transmitted. For a block in which T1$\leq$DR'<T2, (n=1) is assigned; for a block in which T2$\leq$DR'<T3, (n=2) is assigned; for a block in which T3$\leq$DR'<T4, (n=3) is assigned: and for a block in which DR'$\geq$T4, (n=4) is assigned.

In ADRC with variable length encoding, by varying the threshold values T1 to T4, the amount of information which is generated can b readily controlled, that is, the information can be effectively buffered. Thus, even for a transmission path, such as a digital VTR where the amount of information which is generated should be set to a particular value, ADRC with variable length finds ready application.

In FIG. 5, a buffering circuit 60 is provided for determining the threshold values T1 to T4 so as to establish the amount of information which is generated to a particular value. The buffering circuit contains a plurality of sets of threshold values (T1, T2, T3, T4), for example, 32 sets, identified by a parameter code Pi (where i=0, 1, 2, . . . , 31). As the number i of the parameter code Pi increases, the amount of information which is generated decreases. However, as the amount of information which is generated decreases, the quality of the picture being recorded is degraded.

The threshold values T1 to T4 which are selected are supplied from the buffering circuit 60 to a comparison circuit 61. The adjusted dynamic range DR' also is applied to the comparison circuit through a delay circuit 62 which provides a delay period substantially equal to the time for buffering circuit 60 to determine a set of threshold values. Comparison circuit 61 compares the adjusted dynamic range DR' of a block with each threshold value in the selected set. This comparison is coupled to bit number determination circuit 59 and, on the basis thereof, circuit 59 determines the number of quantizing bits to be assigned to the block. Quantizing circuit 58 converts the data PDI into a code signal DT by an edge matching quantizing operation using the adjusted dynamic range DR' and the assigned bit number n. The quantizing circuit 58 may be, for example, a ROM.

The adjusted dynamic range DR' and the average value MIN' are supplied through respective delay circuits 62 and 64 as outputs. In addition, the parameter code Pi, which represents the set of threshold values provided by the buffering circuit 60 and used to generate the code signal DT, is supplied from the circuit 60 as another output. In the embodiment being described, since a signal which has been quantized in a non-edge matching operation is requantized in an edge matching operation in accordance with information concerning the dynamic range, the degradation of pictures that may be subject to multiple dubbing is small.

Practical arrangements of channel encoder 11 (FIG. 1) and channel decoder 22 (FIG. 2) may be as disclosed in Japanese Patent Application No. HEI 1-143,491, having a common assignee herewith, and as now further described with reference to FIGS. 6 and 7, respectively.

Figure 6:
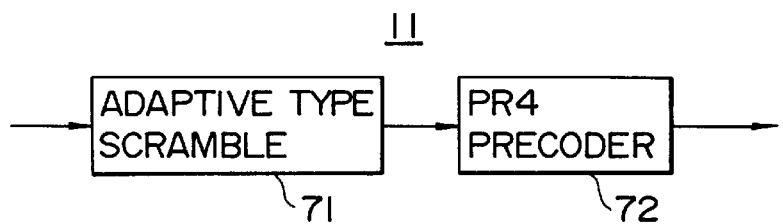
FIG. 6 is a block diagram showing an example of a channel encoder that may be included in the recording circuit of FIG. 1.
Figure 7:
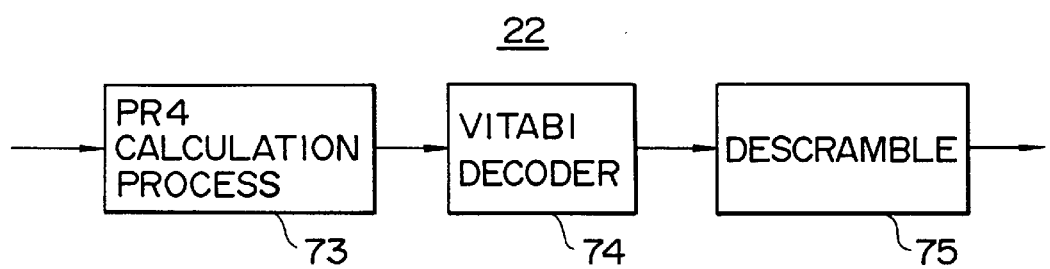
FIG. 7 is a block diagram showing an example of a channel decoder that may be included in the playback circuit of FIG. 2.

More particularly, in the channel encoder of FIG. 6, the output of parity generation circuit 10 (FIG. 1) is supplied to an adaptive type scramble circuit 71. A plurality of M system scramble circuits may be provided, with one of such circuits being selected so that the high frequency component and the DC component of the output signal produced thereby are smallest. The output of scramble circuit 71 is supplied to a partial response class 4 detection type precoder 72.

The precoder calculates $1/(1-D^2)$ (where D is a unit delay or delay operator). The precoder output is supplied to magnetic heads 13A and 13B through record amplifiers 12A and 12B, respectively, for recording on the tape. The reproduced signals recovered by heads 13A and 13B are amplified by playback amplifiers 21A and 21B (FIG. 2) prior to being supplied to a partial response class 4 calculation process circuit 73 in channel decoder 22 (FIG. 7). Circuit 73 performs the calculation 1+D on the reproduced output signals, and the result of such calculation is supplied to a Viterbi decoding circuit 74 for decoding in accordance with the Viterbi algorithm.

As disclosed in "Analog Viterbi Decoding for High Speed Digital Satellite Channels", A. S. Acampora et al., IEEE Transactions on Communications, Vol. Com. 26, No. 10, October 1978, pages 1463–1470; and in "The Viterbi Algorithm", G. D. Forney, Jr., Proceedings of the IEEE, Vol. 61, No. 3, March 1973, pages 268–278, Viterbi decoding circuit 74 utilizes the likelihood of correlation between data that is applied successively thereto for detecting transit of the data, and decodes the data on the basis of the detected result. Since the relationship $(1-D^2)$ of the reproduced signal relative to the signal used for recording is utilized to decode the recording signal from the reproduced signal which then is further decoded by the circuit 74, the bit error rate of the decoded data can be reduced as compared with a standard decoding circuit which decodes data with reference to the signal level. Therefore, the decoded data produced by Viterbi decoding circuit 74 has high noise resistance. More specifically, by reason of the Viterbi decoding circuit in channel decoder 22, the reproduced C/N (carrier/noise) ratio is improved by 3 dB in respect to that achieved if the reproduced digital video signal were to be decoded bit-by-bit.

Figure 2:
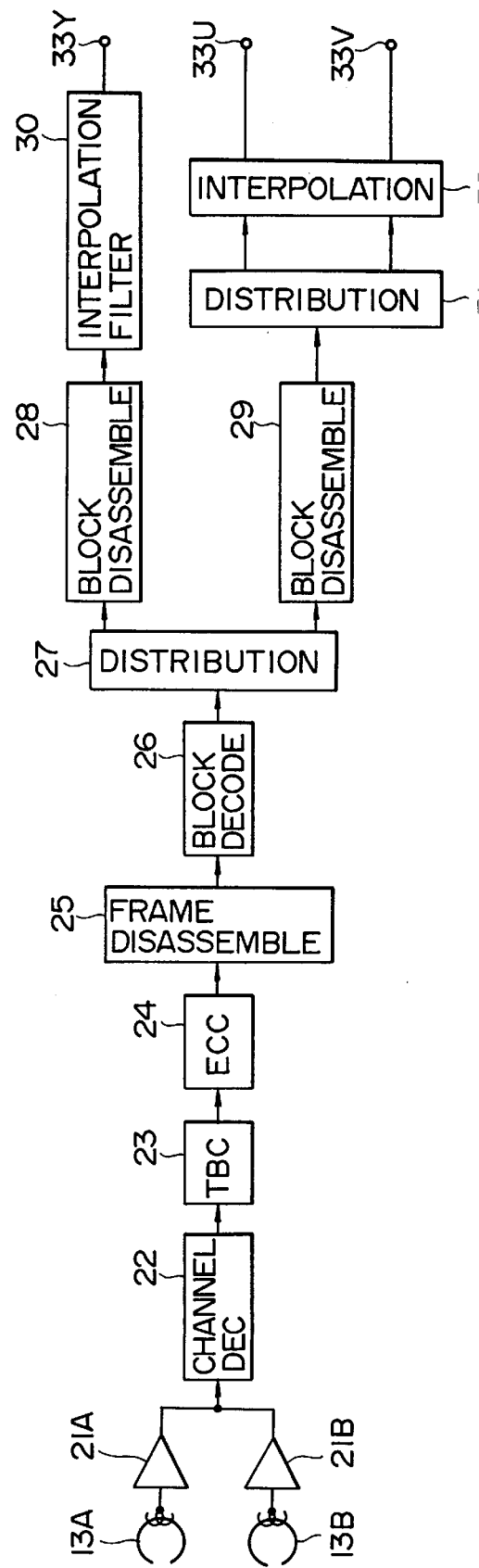
FIG. 2 is a block diagram showing a signal processing portion of a playback circuit in the digital VTR with which the present invention can be used.

The output of Viterbi decoding circuit 74 is supplied to a descrambling circuit 75 which converts the scrambled data (that had been produced by scramble circuit 71 of FIG. 6) back to the original unscrambled data (such as had been supplied to channel encoder 11) for application to TBC circuit 23 (FIG. 2).

Figure 8A:
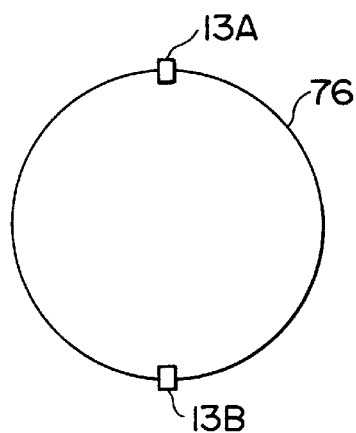
FIGS. 8A and 8B are schematic diagrams illustrating different locations of rotary heads on a tape guiding drum of a VTR.
Figure 8B:
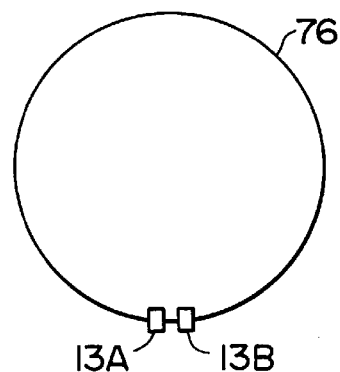

As shown in FIG. 8A, the magnetic heads 13A and 13B may be mounted in diametrically opposed positions on a rotation drum 76. Preferably, however, and as shown in FIG. 8B, magnetic heads 13A and 13B are desirably mounted on drum 76 adjacent each other in a unified construction. A magnetic tape (not shown on either FIG. 8A or 8B) is wrapped obliquely on the peripheral surface of drum 76 with a winding angle which is preferably less than (or, alternatively, slightly greater than) 180°. With the head locations shown in FIG. 8A, magnetic heads 13A and 13B alternatively contact the magnetic tape. On the other hand, with the heads located as shown in FIG. 8B, both of the magnetic heads scan the magnetic tape at the same time.

Figure 9:
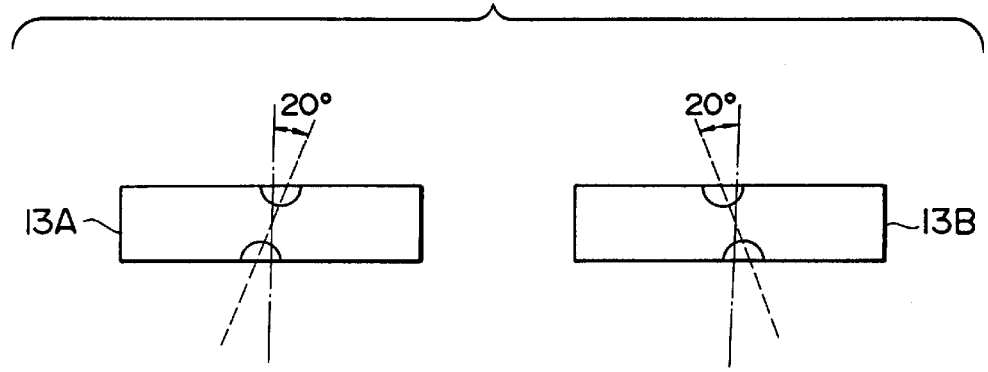
FIG. 9 is a schematic diagram illustrating different azimuths of the heads.
Figure 10:
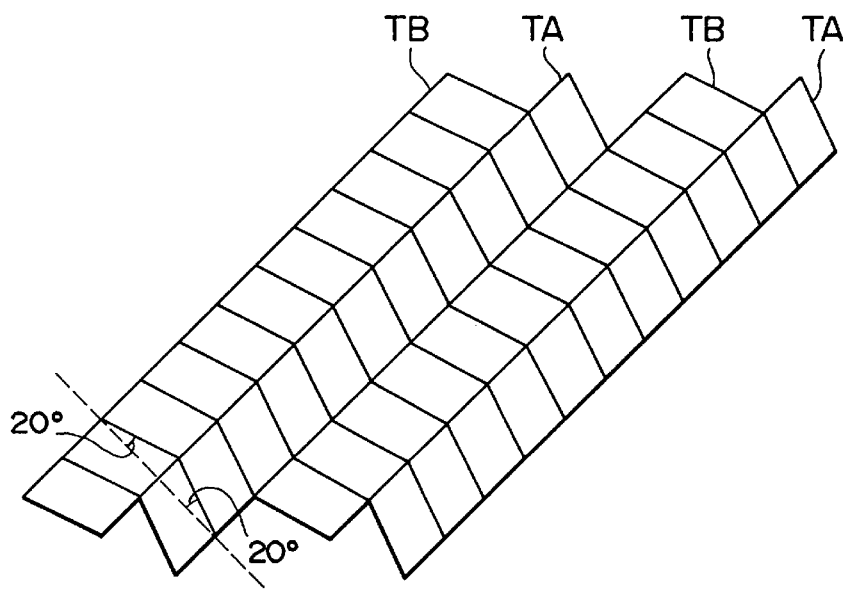
FIG. 10 is a schematic diagram illustrating a recording pattern formed by the heads with different azimuths.

The directions of the gaps of magnetic heads 13A and 13B differ from each other, that is, heads 13A and 13B have different azimuth angles. For example, as shown in FIG. 9, magnetic heads 13A and 13B are provided with azimuth angles of +20° and −20°, respectively. By reason of the different azimuth angles, a record pattern is formed on the magnetic tape, as shown in FIG. 10, in which adjacent tracks TA and TB on the magnetic tape are formed by the respective magnetic heads 13A and 13B, which have different azimuth angles. Thus, when the magnetic tape is played back or reproduced, due to an azimuth loss (or attenuation) which is particularly acute in the case of relatively high frequencies, the amount of cross talk between digital signals recorded in adjacent tracks can be reduced.

Figure 11A:
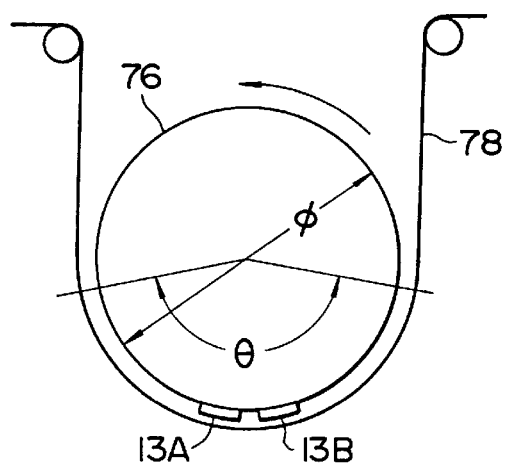
FIG. 11A and 11B respectively are a top view and a side view showing the wrapping of a tape about a head drum assembly in a digital VTR.
Figure 11B:
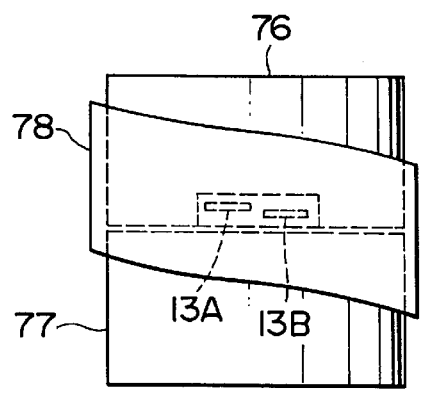

FIGS. 11A and 11B show a practical arrangement in which magnetic heads 13A and 13B are adjacent each other, as in FIG. 8B, and are included in a unified structure to provide a so-called double azimuth head. By way of example, the unified magnetic heads are shown to be mounted on an upper drum 76 which is rotated at a high speed of 150 rpms for the NTSC system, while a lower drum 77 is fixed. Therefore, the unified heads 13A and 13B effect 2½ revolutions with the upper drum 76 for each NTSC field so that each field is recorded in five tracks. In other words, each field is divided into five segments recorded in respective tracks on the magnetic tape. By using this segment system, the length of the tracks can be reduced and, as a result, track linearity error can be decreased. For example, the winding angle θ of the magnetic tape 78 on the drum assembly 76–77 is desirably set to be less than 180°, for example, approximately 166° and the drum diameter φ is desirably determined to be less than 25 mm, for example, 16.5 mm.

Figure 12A:
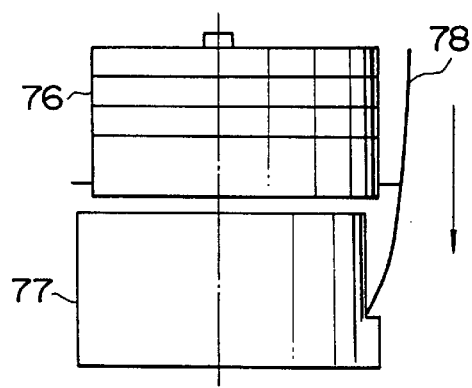
FIGS. 12A and 12B are schematic diagrams to which reference will be made in describing how eccentricity of the head drum results in vibration and non-linearity of the tape.
Figure 12B:
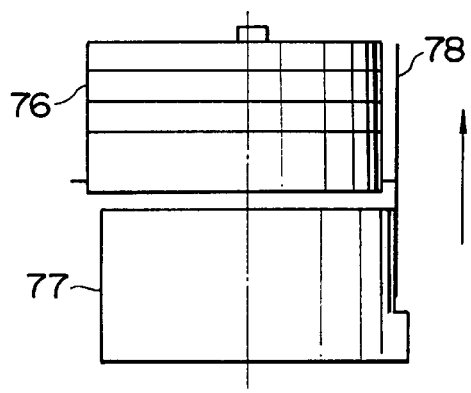

By using the double azimuth head, substantially simultaneous recording is performed by both heads. Normally, due to eccentricity or the like of the rotating upper drum 76 relative to the fixed lower drum 77, magnetic tape 78 vibrates and thereby a track linearity error occurs. As shown in FIGS. 12A and 12B, if the heads are diametrically opposed, the eccentricity of the rotary upper drum 76 may urge tape 78 downwardly when one of the heads, for example, head 13A, traces a track on the tape (FIG. 12A), whereas, tape 78 is urged upwardly when the other head 13B traces a track on the tape (FIG. 12B). By reason of the foregoing, adjacent tracks will be oppositely bowed and track linearity is substantially degraded. On the other hand, when magnetic heads 13A and 13B are unified so as to substantially simultaneously scan respective tracks on the tape, any eccentricity of the rotary upper drum 76 similarly influences the linearity of the tracks scanned by both heads so that the linearity error is relatively reduced. Moreover, the distance between the heads 13A and 13B is relatively small when the heads are unified, as in the so-called double azimuth head, so that the paired heads can be more accurately adjusted than when the heads are diametrically opposed.

By using the above described arrangement of unified heads 13A and 13B simultaneously tracing respective tracks on the tape which has a wrap angle θ of less than 180° about a relatively small diameter drum, substantial non-linearity of tracks with a narrow width can be avoided and signals recorded in such tracks can be accurately traced during recording and reproducing operations.

The tape used in the magnetic recording apparatus in accordance with this invention is desirably produced in accordance with one of the exemplary methods described below so as to contribute to the attainment of the desired high recording density without an equivalent increase in the bit error rate.

In a first example of a tape producing method embodying this invention, a solution containing an emulsion whose principal component is an acrylic ester latex is coated on a base film composed of a polyethylene tere-phthalate (PET) and having a thickness of approximately 10 μm. The base, which is a nonmagnetic substrate, contains $SiO_2$, $TiO_2$ or $Al_2O_3$ as a filler. Thereafter, the base material is dried and thereby only very fine and practically infinitesimal projections of the emulsion particles are formed. As a result, the surface roughness of the base material, measured as the center line average height Ra, is about 0.0015 μm and the density of the fine projections is approximately 5,000,000 particles/mm².

Figure 13:
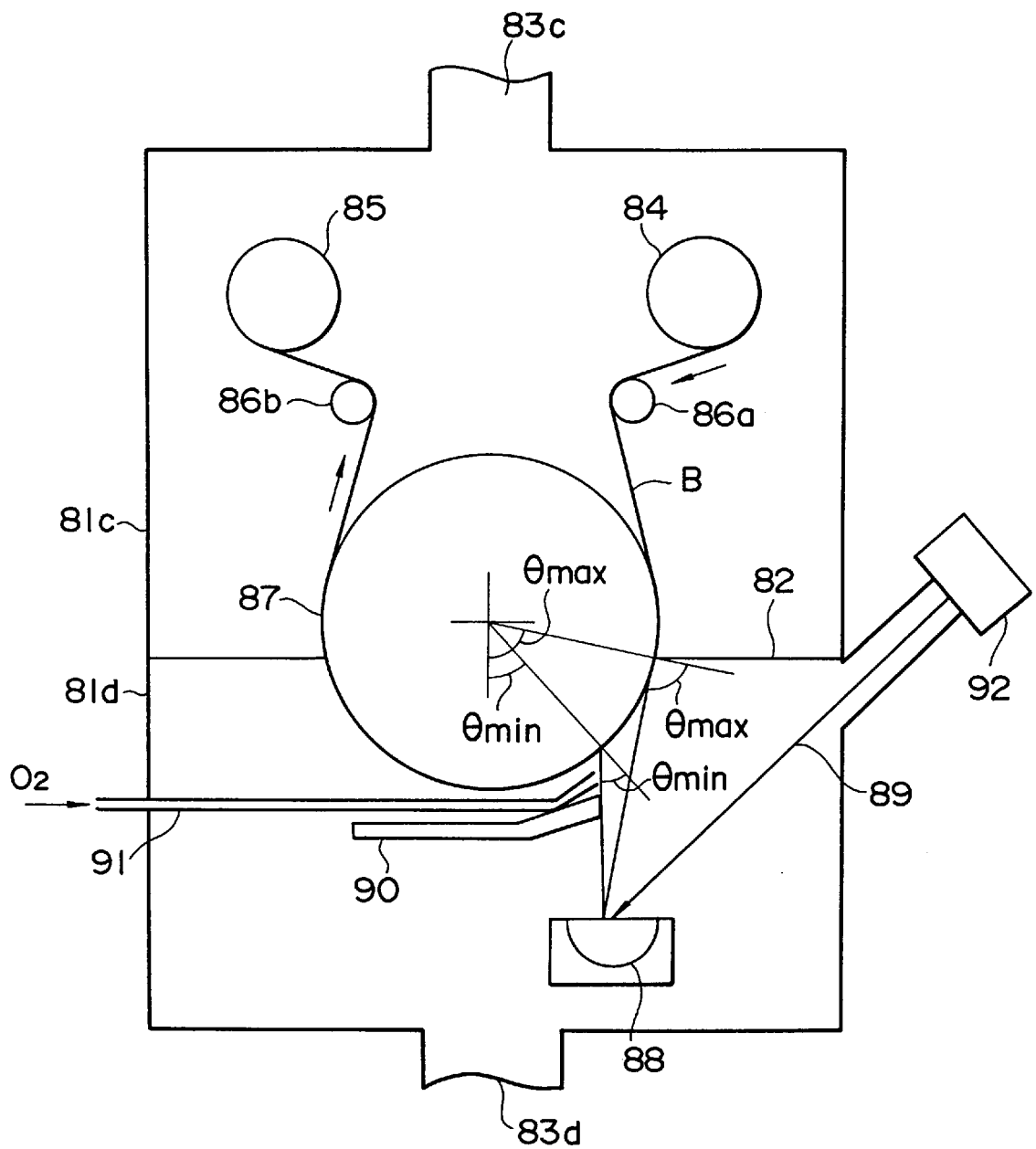
FIG. 13 is a schematic diagram illustrating a method of producing a magnetic tape according to an embodiment of this invention.

Thereafter, by using a vacuum deposition unit shown in FIG. 13, a magnetic layer or coating whose principal component is cobalt (Co) is formed on the base material in an oxygen atmosphere by the so-called diagonal- or slant-deposition method. In one embodiment, the magnetic layer is formed of an oxide film sandwiched between magnetic metal thin films.

More particularly, the vacuum deposition unit illustrated in FIG. 13 includes upper and lower vacuum chambers 81c and 81d, respectively, with a horizontal partition 82 therebetween, and with a supply roll 84 of base material and a take-up roll 85 of processed tape rotatably mounted at spaced apart locations within upper vacuum chamber 81c. A cylindrical cooling can 87 is rotatably mounted between chambers 81c and 81d and extends through an opening in the partition 82. The web of base material B unwound from supply roll 84 is led by a guide roll 86a so as to run around cylindrical cooling can 87 within vacuum chamber 81d and then be guided from can 87 by a guide roll 86b for rewinding on take-up roll 85. An evaporation source 88, which may be of Co, such as a 100% Co ingot, or a Co-Ni alloy, such as $Co_{80}Ni_{20}$ alloy, is disposed within vacuum chamber 81d below cooling can 87 and is heated by an electron beam 89 emitted by an electron source 92, such as an electron gun. An insulating shield plate 90 extends under can 87 for restricting the incident angles θ at which the Co or Co-Ni alloy evaporated from source 88 impinges on the base material B running under cooling can 87. An oxygen gas supply pipe 91 extends between shield plate 90 and can 87 for directing a flow of oxygen toward the surface of the base material B at the area thereof where evaporated Co or Co-Ni alloy is being deposited on the base material. The thickness of the magnetic metal film thus deposited is on the order of, for example, 900° A.

In the vacuum deposition unit shown on FIG. 13, a film of Co or Co-Ni alloy is diagonally deposited on the base material B at cooling can 87 in the oxygen atmosphere so as to form the magnetic layer. During such operation of the vacuum deposition unit, vacuum chambers 81c and 81d are maintained at a vacuum of $1\times10^{-4}$ Torr., for example, through vacuum connections 83c and 83d, while oxygen gas is introduced through pipe 91 at a rate of 200 cc/min.

Shield plate 90 is positioned so that the incident angle of the evaporated Co or Co-Ni alloy relative to a normal to the base material B on cooling can 87 is in the range 45° to 90°. As explained in "Microstructure of Iron Thin Films Evaporated at Oblique Incidence", K. Ozawa et al., J. Magnetism and Magnetic Materials 40(1983) pp 175–184, North Holland Publishing Company, any crystalline thin film, such as cobalt or cobalt-nickel, produced by vapor deposition at an oblique incidence angle generally exhibits a columnar structure with the columns formed of evaporated crystal grains. U.S. Pat. No. 5,247,397 (Sato et al.) shows the vacuum deposition unit of FIG. 13 of the present application, and the columnar structure of the magnetic tape formed by this vacuum deposition unit.

The deposition of the magnetic metal film on the base material for forming the magnetic coating is timed so that the thickness of the resulting magnetic coating, or layer, is substantially 900 Å. Subsequently, after the entire magnetic layer is deposited, the coated base material is further treated, as by coating the back or underside of the base material with a uniform mixture of carbon and epoxy resin binder, and the magnetic layer is top coated with a perfluoro-polyether as a lubricant. The coated web of base material then is cut into strips having widths of 8 mm, so as to provide the desired 8 mm format magnetic tapes therefrom.

In one embodiment, after the magnetic thin film is deposited, an intermediate nonmagnetic layer, preferably an oxide film, such as a $Co_3O_4$ film, of a thickness of the order of 200 Å is formed, for example, by dc magnetron sputtering over the magnetic metal thin film formed on the base B. In dc magnetron sputtering, a 100% Co target is used for reactive sputtering in an atmosphere of a mixed gas consisting of oxygen and argon. The distance between the target and the base B is, for example, 20 mm. As one example, the flow rate of the argon gas is 200 cc/min and that of the oxygen gas is 70 cc/min. The transport speed of the base B is on the order of about 10 m/min.

After the nonmagnetic layer is formed, another magnetic metal thin film of Co having a thickness, for example, on the order of 900 Å is formed thereover by the vacuum evaporation apparatus shown in FIG. 13 in accordance with the same process as explained above. Thus, a multilayer magnetic layer consisting of a lower magnetic metal thin film, an intermediate nonmagnetic (or oxide) film and an upper magnetic metal thin film, in which the upper and lower magnetic metal thin films sandwich the nonmagnetic layer therebetween, is constructed. The overall or total thickness of the multilayer magnetic layer is on the order of 2000 Å.

Then, the base B having the multilayer magnetic layer deposited thereon is back coated with a coating material containing, for example, carbon and an epoxy binder, and is topcoated with a lubricant containing perfluoropolyether. The resultant magnetic recording medium then is cut in 8 mm magnetic tapes.

The characteristics of magnetic tapes fabricated in accordance with the foregoing process but differing from each other in the type of construction used for the magnetic layer and in the thickness of the intermediate nonmagnetic layer, or oxide film, are set out in FIG. 14, as are the characteristics of a comparative example. In FIG. 14, $R_a$ indicates the center line average roughness of the magnetic layer formed on base B.

One construction of the magnetic layer is referred to as an "equal two-layer construction", which means that the longitudinal axes of columns formed by crystal grains, also referred to as deposited particles, in the lower magnetic metal thin film are aligned in the same direction as the longitudinal axes of columns formed by crystal grains in the upper magnetic metal thin film.

Another construction of the magnetic layer is referred to as an "inverse two-layer construction", which means that the longitudinal axes of the columns formed by crystal grains in the lower magnetic metal thin film are aligned oppositely to the longitudinal axes of the columns formed by crystal grains in the upper magnetic metal thin film. The foregoing alignments are all with respect to the normal to the surface of the magnetic layer.

As is seen from FIG. 14, bit error rates in the magnetic media of Examples 1 to 4, each of which is formed of alternate magnetic metal and nonmagnetic thin films, with the nonmagnetic film being intermediate the magnetic metal thin films, are less than $1\times10^{-4}$, whereas the bit error rate in the magnetic medium of the comparative example, which is formed with a single layer of magnetic metal, is as large as $4.8\times10^{-4}$. The raw bit error rate, that is, the bit error rate prior to correction, should be $10^{-4}$ or less to ensure that error will be contained within a correctable amount when error correction codes with a redundancy of about 20% are employed. All the magnetic media in Examples 1 to 4 as well as the magnetic medium of the comparative example meet the restriction that $R_a \leq 30$ Å and the energy product $\leq 100$ gauss·cm·Oe (which is the product of residual magnetic flux, thickness and coercivity).

Typically, the surface roughness of magnetic tapes is measured in accordance with JIS B0601. Using this standard, the surface roughness of Examples 1 to 4 as well as that of the comparative example was measured under the following conditions.

Figure 15:
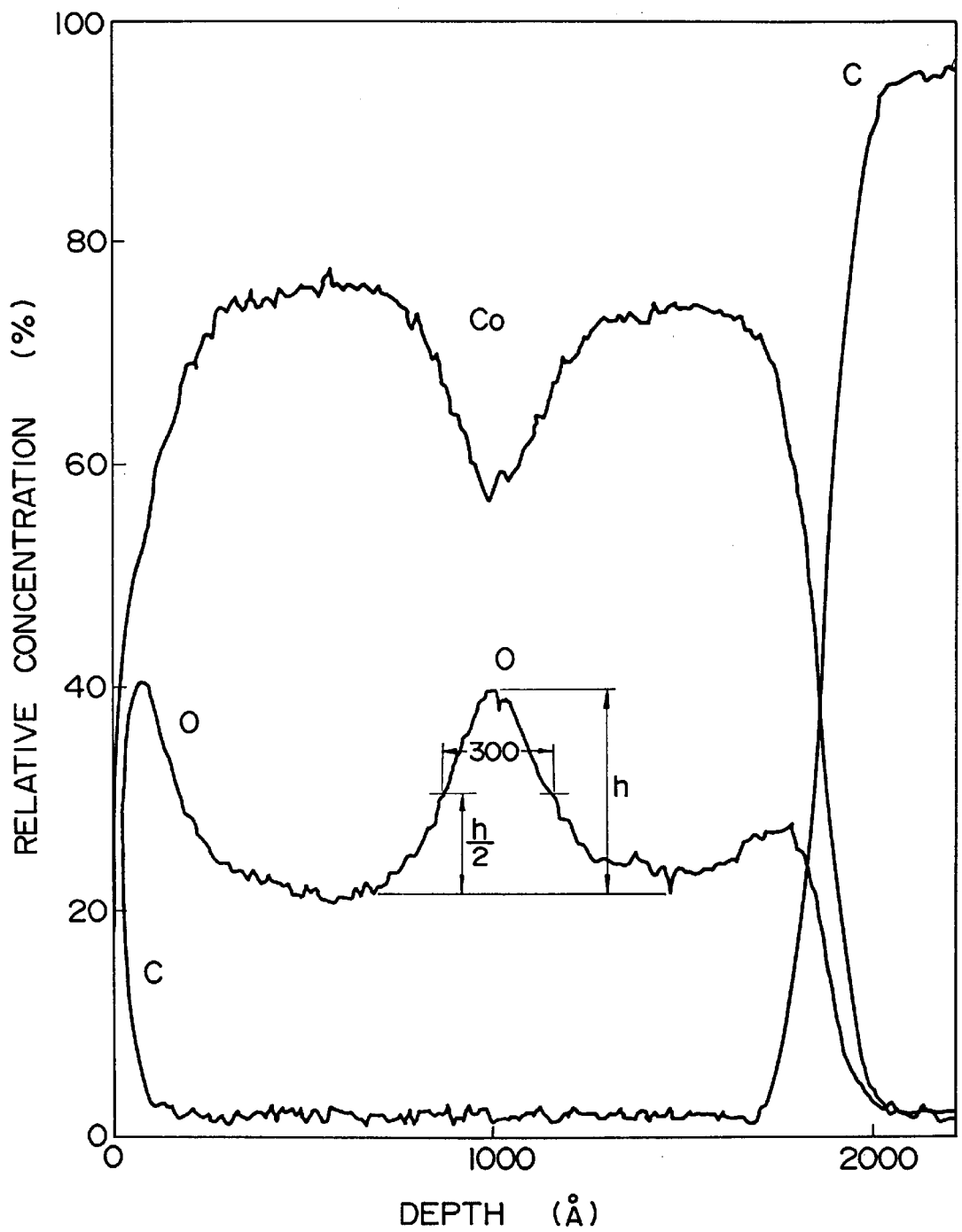
FIG. 15 is a graphical representation of an Auger electron spectroscopy profile of the depth of the respective magnetic metal thin films and nonmagnetic material in the magnetic layer of the recording medium of the present invention.

Surface roughness tester: Talistep (Ranku Teira)
Needle: Square needle of 0.2 μm×0.2 μm
Pressure: 2 mg
Bypass filter: 0.33 Hz FIG. 15 illustrates an Auger profile of the depth (thickness) of the individual films comprising the magnetic layer, as measured by an Auger electron spectroscope (Jamp 30, Nippon Denshi K.K.). Incident electron acceleration voltage was 2.00 kV, the degree of vacuum was $9.0\times10^{-8}$ Pa, the time constant of the Auger electron analyzing system was 20 ms, the etching ion acceleration voltage was 1.00 kV, and the etching rate was 16.6 Å/min. As is seen from the Auger electron spectroscopy profile of FIG. 15, two peaks for Co represent the lower and upper magnetic metal thin films and the peak for O between the two Co peaks represents the intermediate oxide film sandwiched between the lower and upper magnetic metal thin films. The width of the O peak at concentration levels approximately half the maximum concentration of the O peak is about 300 Å. Transition layers are present between the lower magnetic metal film and the intermediate oxide film and also between the upper magnetic metal film and the intermediate film, and the boundaries therebetween are not necessarily distinct. However, the thickness of the intermediate oxide film can be determined by using the width of the half peak concentration levels for O.

The magnetic layer formed of alternate magnetic metal and oxide films reduces the magnetic coupling of the magnetic layer and improves the electromagnetic conversion characteristics if a signal having a short wavelength is recorded, such as a wavelength of 0.5 μm. In particular, the electromagnetic conversion characteristics are satisfactory if the thickness of the nonmagnetic layer, that is, the thickness of the intermediate oxide film, is no greater than 20% of the thickness of the magnetic layer. With this thickness, the bit error rate can be reduced.

The level of the output signal reproduced from a magnetic layer formed of the aforedescribed multilayer construction is too low if the thickness of the magnetic metal thin film is less than 600 Å, and noise increases if this thickness is greater than 1200 Å. Therefore, the preferable thickness of the magnetic metal thin film, particularly of Co, is in the range 600 to 1200 Å. A preferably thickness of the intermediate oxide film is no greater than 300 Å because it is difficult to pick up signals from the lower magnetic thin film if the thickness of the intermediate oxide film is greater than 300 Å.

Figure 16:
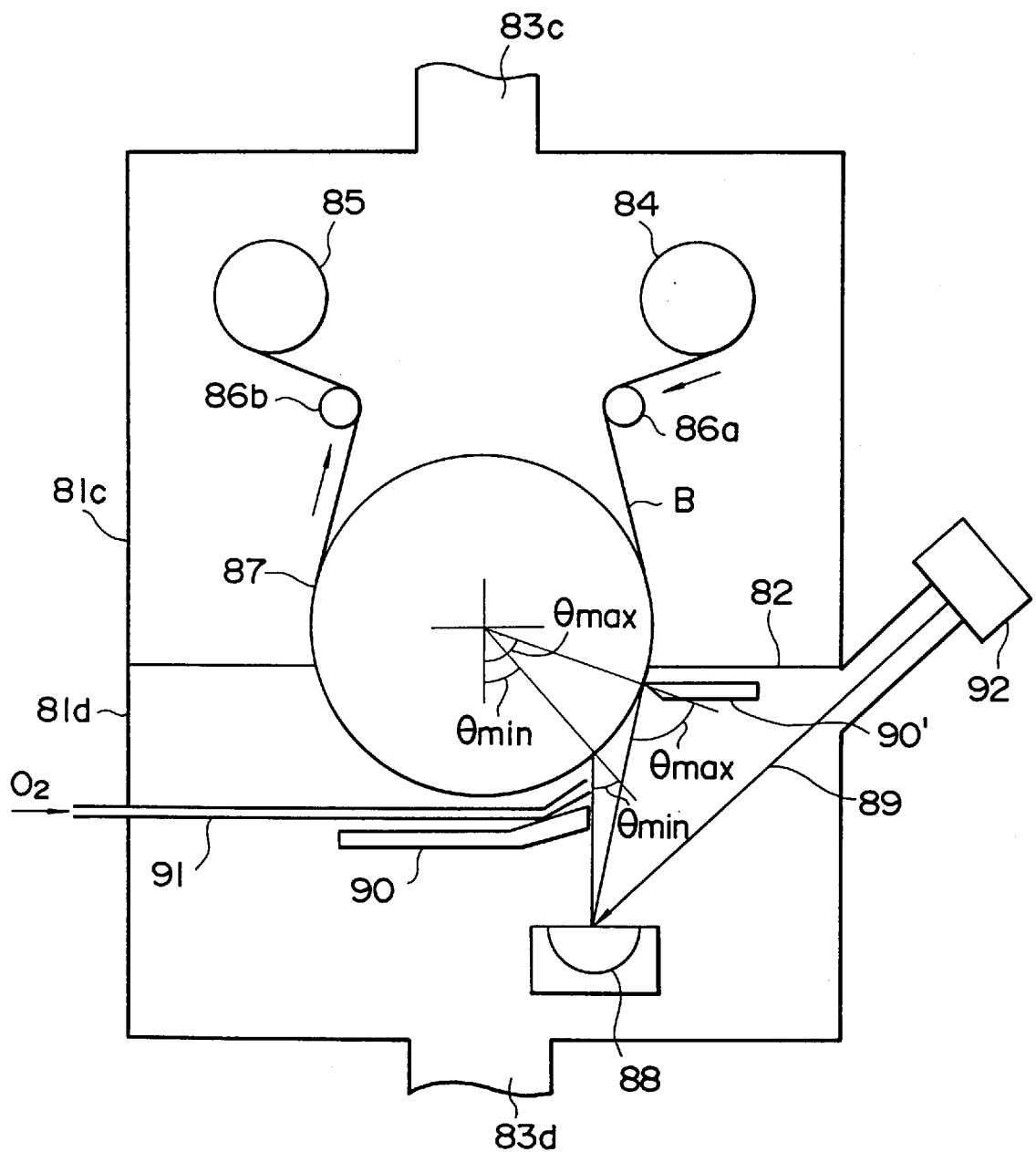
FIG. 16 is a schematic diagram illustrating another method of producing a magnetic tape according to this invention.

In accordance with another embodiment of the present invention, the aforedescribed intermediate nonmagnetic layer is omitted and a single magnetic metal thin film of Co is formed in an oxygen atmosphere by diagonal deposition on base B by using the vacuum evaporation apparatus shown in FIG. 16. The apparatus of FIG. 16 differs from that shown in FIG. 13 in that the incident angle θ of evaporated metal particles on the base B is limited to a range of 30° ($\theta_{min}$) to 70° ($\theta_{max}$) and preferably 40° to 70°, by a shielding plate 90'.

During vacuum evaporation, the interior of vacuum tanks 81c and 81d is maintained at a vacuum of, for example, $1\times10^{-4}$ torr and oxygen gas is supplied through an oxygen supply pipe 91 into the vacuum tanks 81c and 81d at a rate of, for example, 200 cc/min. The thickness of the single magnetic metal thin film deposited on base B is on the order of about 2000 Å. In this example, evaporation source 88 is a 100% Co ingot.

When the incident angle θ is limited to a narrow range, such as mentioned above, the deposition rate decreases.

Accordingly, the transport speed of the base B is regulated as a function of the range of the incident angle θ so that the magnetic metal thin film is deposited at a desired deposition rate and, thus, thickness.

8 mm wide magnetic tapes are obtained by the same procedure as that discussed above.

FIG. 17 represents the characteristics exhibited by magnetic tapes in which the magnetic layer is deposited at different incident angles θ. As is seen from FIG. 17, the magnetic metal thin film formed by vacuum evaporation in Example 5 has its incident angle θ limited to a range of 40° to 70° and produces an output level of 0.5 dB for a recording wavelength λ=0.5 μm, with a bit error rate as small as $5.0 \times 10^{-5}$. The magnetic metal thin film formed by vacuum evaporation in Example 6 has its incident angle θ limited to a narrower range of 45° to 65°, and produces an output level of 0.7 dB for λ=0.5 μm, with a bit error rate as small as $3.8 \times 10^{-5}$. This is in comparison with a comparative example in which the magnetic metal thin film formed by vacuum evaporation has its incident angle θ in the range of 40° to 90° and produces an output level of 0 dB for λ=0.5 μm with a bit error rate as large as $6.6 \times 10^{-4}$.

The relatively large output level for a recording signal wavelength of λ=0.5 μm and the small bit error rate of Examples 5 and 6 in which the magnetic layer is deposited by vacuum evaporation with the incident angle θ of evaporated metal particles on the substrate limited to the range of 40° to 70° or 45° to 65° are believed to be due to the following reasons. When the incident angle θ is limited to this range, the component of the deposited metal particles parallel to the surface of base B is small and the grain size of the crystal grains of the magnetic layer also is small, so that the density of the crystal grains in the magnetic layer is high so as to improve the ratio of carrier level to noise level (C/N), which reduces the bit error rate.

The aforementioned improvement in bit error rate by limiting the range of the incident angle θ can also be applied to a multilayer magnetic layer formed in the manner described above. This is illustrated in FIG. 18, wherein Examples 7 and 8 are formed of multi-layer construction of alternate magnetic and nonmagnetic films in which the incident angle θ is limited to the range of 40° to 70°. Here the bit error rates are $2.8 \times 10^{-5}$ and $3.3 \times 10^{-5}$, respectively, which are smaller than those of Examples 1, 2, 3 and 4 shown in FIG. 14. This compares favorably to the bit error rate as large as $4.8 \times 10^{-4}$ of the comparative example in which the magnetic metal thin film is formed by depositing metal particles at an incident angle θ in the range of 40° to 90°. FIG. 18 also illustrates the characteristics of a reference example formed of a multilayer magnetic layer in which the magnetic metal thin films are formed by depositing metal particles at an incident angle θ in the range of 45° to 90°, with a nonmagnetic intermediate layer between them.

The characteristics exhibited by magnetic tapes in accordance with U.S. Pat. No. 4,900,622 (Nakayama et al.) in Examples N1, N2, N3, and a magnetic tape in accordance with the present invention in Example 9 will be discussed below.

In Examples N1, N2, N3, the angle of the columns formed by deposited particles in the upper magnetic metal thin film layer is in the range 20–35° (55–70° relative to a normal to the base material) in accordance with Nakayama's teaching (column 11, lines 60–64) that the upper column angle be in the range 0–70° (20–90° relative to a normal), while the angle of the columns in the lower magnetic metal thin film layer is in the range 45–60° (30–45° relative to a normal to the base material) in accordance with Nakayama's teaching (column 11, line 65—column 12, line 7) that the lower column angle be approximately upright, that is, in the range 40–90° (0–50° relative to a normal), and the bit error rate is in the range $1.1 \times 10^{-4}$ to $1.9 \times 10^{-4}$, which is an unacceptably high bit error rate.

In Example 9, the angles of the columns in the upper and lower magnetic metal thin films are 45° and 35°, respectively (45° and 55° relative to a normal to the base material) in accordance with a preferred upper magnetic metal thin film column angle of 40–90° (0–50° relative to a normal) and a preferred lower magnetic metal thin film column angle of 0–40° (50–90° relative to a normal), and the bit error rate is $2.4 \times 10^{-5}$.

The bit error rate of Example 9 exhibits approximately an order of magnitude improvement relative to Examples N1–N3 and is sufficiently low that the magnetic tape of Example 9 is useful with error correction codes having a redundancy of about 20%, whereas the magnetic tapes of Examples N1–N3 are not similarly useful due to their unacceptably high bit error rates.

The preferred column angles in the magnetic metal thin films of the present invnetion are chosen in recognition of the fact that if the column angle is approximately the same as the angle of a magnetic flux line around a head gap generated by the magnetic field of a recording head, then recording efficiency is improved, as discussed in "Rig Head Recording Mechanisms and Characteristics of Obliquely Oriented Media", I. Tagawa et al., J. Magnetics Society of Japan, vol. 15 supplement no. S2 (1991), pp 827–832. Generally, the flux line has a bowl ("U") shape within the magnetic tape, so the columns in the upper magnetic metal thin film should be at a large angle, that is, approximately upright, and the columns in the lower magnetic metal thin film should be at a small angle. The columns in the lower films of Examples N1–N3 are at a steep angle, so recording efficiency is reduced and the bit error rate is increased for the tapes of Examples N1–N3 relative to the tape of Example 9.

The present invention may be used to produce a magnetic recording medium for recording both digital and analog video signals. When formed with a multilayer magnetic layer, particularly for the recording of analog video signals, n layers of magnetic metal thin films may be interposed wit n-1 layers of nonmagnetic intermediate films. The nonmagnetic intermediate layers suppress magnetic mutual actions between the magnetic metal thin films and reduce noise.

As mentioned above, the nonmagnetic intermediate film is formed of an oxide, and in addition to what has been described previously, may be an oxide of Cr, Si, Al, Mn, Bi, Ti, Sn, Pb, In, Zn or Cu, or a composite oxide of these metals. As also discussed previously, the total thickness of the nonmagnetic intermediate film is 20% or less of the total or overall thickness of the magnetic recording layer. If the total thickness of the nonmagnetic intermediate film exceeds 20% of the thickness of the magnetic layer, it is difficult to obtain improved electromagnetic conversion characteristics, particularly when a short wavelength signal is recorded. Preferably, the thickness of each nonmagnetic layer is not greater than about 300 Å because otherwise the detection of signals recorded in the underlying magnetic metal thin film is difficult.

When depositing the magnetic thin film by vacuum evaporation (although other techniques known to those of ordinary skill in the art can be used), it is preferred to limit the incident angle θ to the range of 30° to 70°. If the incident angle is greater than 70°, evaporation efficiency decreases and the in-plane magnetization component increases. If the incident angle is smaller than 30°, the particle grain size in the magnetic metal thin film increases to the detriment of the magnetic characteristics.

Although the present invention has been described in which Co or a Co-Ni alloy forms the magnetic metal thin film, other magnetic metals may be used, such as Co-Cr, Co-Fe-Ni or Co-Ni-Cr. Preferably, at least for analog recording, the thickness of each magnetic metal thin film is in the range of about 600 to about 1200 Å. Magnetic metal thin films of a smaller thickness reduce the output characteristics, and those of a greater thickness tend to increase noise.

In another multilayer fabrication, the magnetic recording medium has a recording layer formed of a first magnetic metal thin film deposited on the nonmagnetic substrate, a first intermediate oxide film formed over the first magnetic metal thin film, a second magnetic metal thin film formed over the first intermediate oxide film, a second intermediate oxide film of 200 Å thickness formed over the second magnetic metal thin film, and a third magnetic metal thin film formed over the second intermediate oxide film. The directions of growth of inclined columnar structures of the first, second and third magnetic metal thin films are the same.

The output characteristics and C/N ratios of the magnetic recording media fabricated in accordance with Examples 1, 2 and 4 of FIG. 14 and Example 7 of FIG. 18 were measured to assess their analog recording capabilities. In measuring the output characteristics, input signals of 0.5 μm wavelength were recorded on magnetic tapes of 8 mm width and the recorded signals were reproduced by an 8 mm video tape recorder (EVS-900, Sony Corp.). The C/N ratios were measured by recording input signals of 0.5 μm wavelength by the same 8 mm video tape recorder (EVS-900, Sony Corp.). Values shown below are those relative to the output characteristics and C/N ratio of the single layer comparative example shown in FIGS. 14 and 18.

| Example | Construction | Thickness intermediate layer (Å) | Thickness magnetic layer (Å) | Incident angle | Output (dB) | C/N (dB) |
|---|---|---|---|---|---|---|
| 1 | multi-layer | 200 | 2000 | 40–90 | +1.6 | +2.5 |
| 2 | multi-layer | 100 | 2000 | 40–90 | +2.0 | +2.6 |
| 4 | multi-layer | 200 | 2000 | 40–90 | +0.9 | +1.2 |
| 7 | multi-layer | 200 | 2000 | 40–70 | +2.1 | +2.8 |
| Comparative | single-layer | — | 2000 | 40–90 | 0 | 0 |

The output characteristics and C/N ratios of the magnetic recording media constructed with the limited incident angle of aforedescribed Examples 5 and 6, but having the magnetic metal film formed of $Co_{80}Ni_{20}$ alloy are shown below, in comparison with the output characteristics and C/N ratio of a $Co_{80}Ni_{20}$ comparative example whose incident angle is in the range 40° to 90°. Here, the output characteristics are measured reproduced output signals relative to that of the comparative example when input signals of 0.5 μm wavelength are recorded on and reproduced from the magnetic media. The frequency characteristics are the degree of attenuation of reproduced output signal components of 10MHz relative to the attenuation of reproduced output signal components of 5 MHz referenced to that of the comparative example.

| Example | Incident angle Θ | Energy product (G · cm · Oe) | Output (dB) | C/N (dB) |
|---|---|---|---|---|
| 5 | 40–70 | 148 | +0.5 | +2.5 |
| 6 | 45–65 | 153 | +0.7 | +2.5 |
| Comparative | 40–90 | 140 | 0 | 0 |

As is apparent from the foregoing, improved output characteristics of the magnetic recording media are achieved in accordance with the present invention. An examination of the measured values with reference to those for the comparative example shows that the present invention suppresses the attenuation of the reproduced output signal component at 10 MHz relative to the reproduced output signal component at 5 MHz.

Referring now to FIG. 19, it will be seen that a magnetic head desirably used to record on or reproduce from the magnetic recording medium embodying the present invention has monocrystal Mn-Zn ferrite cores 101A and 101B on which Fe-Ga-Si-Ru soft magnetic layers 102 and 103 are formed, by sputtering, for forming a gap 104 therebetween. Both sides of gap 104, in the direction of the track width, are filled with glass, as at 105 and 106, to limit the effective gap length to 0.20 μm, and thereby limit the track width to approximately 4 μm. A winding hole 107 is provided for receiving a recording coil (not shown).

Since the magnetic head of FIG. 19 provides the Fe-Ga-Si-Ru soft magnetic layers 102 and 103 having a saturation magnetic flux density Bs of 14.5 kG in the vicinity of gap 104, it is possible for the magnetic head to record data on a magnetic tape of high coercive force without causing magnetic saturation within the head.

By using the (ME) metal evaporated tape produced in accordance with any one of the foregoing examples and the magnetic head as described above, a recorded bit area of 1.25 $\mu m^2$/bit or less (e.g. 1 $\mu m^2$/bit) can be achieved, so as to obtain an areal recording density of at least 0.8 bits/$\mu m^2$. In other words, the described ME tape and magnetic head enable the recording of a signal with the wavelength of 0.5 μm on a track having a width of 5 μm with the bit area of 1.25 $\mu m^2$/bit, while minimizing the deterioration of the C/N ratio of the reproduced output that otherwise results as the recording wavelength and track width are reduced.

In 1988, the assignee of this invention produced an experimental consumer digital VTR which incorporated an ADRC bit reduction scheme, scrambled NRZ coding, a class IV partial response (PR4) detection scheme, and a modified 8 mm video transport mechanism used with ME tape. With a rotary drum having a diameter of 40 mm and a rotation speed of 60 rps, and using a track pitch of 15 μm at the wavelength of 0.5 μm, a raw bit error rate of $4 \times 10^{-5}$ and a C/N of 51 dB (with a resolution bandwidth of 30 KHz) at the half-Nyquist frequency were obtained. When such experimental consumer digital VTR was used with a track width of 5 μm, the C/N obtained was only approximately 44 dB and the picture quality was correspondingly degraded. However, the various features described above in respect to the magnetic tape and heads used for magnetically recording digital data in accordance with this invention, compensate for the reduction of the C/N by 7 dB, that is, provide a C/N of 51 dB with a track pitch of 5 μm. In connection with the foregoing, it is known that an increase in the space between the tape and the magnetic head when recording or reproducing a signal on the tape causes the signal output level to decrease. Further, it is known that the space between the tape and the magnetic head depends on the flatness of the tape. In the case of a tape of the coated-type, the flatness of the tape depends on the coating material that is used, whereas, in the case of a vacuum deposited tape, such as the ME tape in accordance with this invention, the flatness of the tape surface depends on the smoothness of the base material on which the metal is vacuum deposited. It has been determined that, when the surface of the base film is made as flat as possible, for example, as described above, the C/N is increased by 1 dB. Furthermore, by effecting the vacuum deposition of primarily cobalt on such base material or film in the manner described above with reference to FIGS. 13 and 16, the C/N ratio is further improved by 3 dB, as compared with the tape used in the experimental consumer digital VTR produced in 1988. Further, by using a Viterbi channel decoding scheme, as described above, there is realized a further increase of 3 dB in the C/N ratio over the bit-by-bit decoding scheme employed in the experimental apparatus.

As a result, the deterioration of 7 dB in the C/N ratio associated with a reduction of the track pitch to 5 $\mu$m is fully compensated so that, with a recording density resulting in a bit area of 1.25 $\mu m^2$/bit, the described embodiment of this invention achieves a raw bit error rate of $4 \times 10^{-5}$, that is, a raw bit error rate equivalent to that achieved by the experimental apparatus of 1988 with a track pitch of 15 $\mu$m. In connection with the foregoing, it is to be noted that the raw bit error rate, that is, the bit error rate prior to correction, should be $10^{-4}$ or less in order to ensure that errors will be contained within a correctable amount when error correction codes with a redundancy of about 20% are employed.

Having described illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims.

What is claimed is:

1. A magnetic recording medium, comprising a nonmagnetic substrate and a magnetic layer vacuum deposited on a surface of said substrate, said magnetic layer being formed of two thin films of magnetic metal and a layer of nonmagnetic material sandwiched between said magnetic metal thin films for reducing magnetic coupling between said magnetic metal thin films, said layer of nonmagnetic material having a thickness no greater than 20% of the thickness of said magnetic layer, said magnetic layer having an energy product of at least 100 gauss·cm·Oe as the product of its residual magnetic flux density, thickness and coercive force, and said magnetic layer having a surface roughness no greater than 0.003 $\mu$m in center line average height, wherein said magnetic metal thin films are provided with columns of deposited particles and an angle of the columns of the lower of said magnetic metal thin films is within the range of 50–90° relative to a normal to said nonmagnetic substrate and wherein an angle of the columns of an upper of said magnetic metal thin films is within the range of 0–50° relative to a normal to said nonmagnetic substrate, wherein said layer of nonmagnetic material has a thickness no greater than 300 Å, and each of said magnetic metal thin films has a thickness in the range 600 Å to 1200 Å wherein at least one of said magnetic metal thin films is vacuum deposited onto said nonmagnetic substrate at an incident angle relative to a normal to said surface of said substrate, said incident angle being greater than 30° so as to prevent particle grain size in said magnetic metal thin film from increasing causing detriment to magnetic characteristics therein and such that said incident angle being less than 70° so as to prevent evaporation efficiency increases causing in-plane magnetism component decreases therein.

2. The magnetic recording medium of claim 1 wherein said magnetic layer provides a bit error rate of less than $10^{-4}$.

3. The magnetic recording medium of claim 1 wherein said layer of nonmagnetic material has a thickness approximately 10% of the thickness of said magnetic layer.

4. The magnetic recording medium of claim 1 wherein said layer of nonmagnetic material has a thickness approximately 5% of the thickness of said magnetic layer.

5. The magnetic recording medium of claim 1 wherein said layer of nonmagnetic material has a thickness on the order of about 200 Å.

6. The magnetic recording medium of claim 5 wherein each of said magnetic metal thin films has a thickness on the order of about 900 Å.

7. The magnetic recording medium of claim 1 wherein said two magnetic metal thin films are provided with columns of crystal grains having longitudinal axes that extend in the same direction in both films relative to the surface of each magnetic film.

8. The magnetic recording medium of claim 1 wherein said two magnetic metal thin films are provided with columns of crystal grains having longitudinal axes that extend in opposite directions in the respective films relative to the surface of each magnetic film.

9. The magnetic recording medium of claim 1 wherein said magnetic metal is Co and wherein said layer of nonmagnetic material is an oxide of Co.

10. The magnetic recording medium of claim 1 wherein said magnetic metal is a Co-Ni alloy.

11. The magnetic recording medium of claim 1 wherein said incident angle is in the range of 40° to 70°.

12. The magnetic recording medium of claim 1 wherein said layer of nonmagnetic material having a thickness greater than 5% of the thickness of said magnetic layer, and the thickness of the magnetic layer being in the range of about 2000 Å to 2400 Å, and said magnetic layer having a surface roughness in the range of about 0.002 $\mu$m to 0.003 $\mu$m in center line average height.

13. The magnetic recording medium of claim 12 wherein said magnetic layer provides a bit error rate of less than $10^{-4}$.

* * * * *